United States Patent
Mandler et al.

[11] 4,123,144
[45] Oct. 31, 1978

[54] FOUR-MEMBER GAUSS OBJECTIVE

[75] Inventors: Walter Mandler; Garry Edwards; Erich Wagner, all of Midland, Canada

[73] Assignee: Ernst Leitz Wetzlar GmbH, Wetzlar, Fed. Rep. of Germany

[21] Appl. No.: 797,386

[22] Filed: May 16, 1977

[30] Foreign Application Priority Data

May 18, 1976 [DE] Fed. Rep. of Germany ....... 2621981

[51] Int. Cl.$^2$ .............................................. G02B 9/36
[52] U.S. Cl. .................................................. 350/222
[58] Field of Search ........................................ 350/222

[56] References Cited

FOREIGN PATENT DOCUMENTS 118,433  3/1901  Fed. Rep. of Germany ........... 350/222

OTHER PUBLICATIONS

T. Suzuki et al., "System . . . Method," *JOSA*, vol. 56, No. 5, pp. 677–683, May 1966.

*Primary Examiner*—Paul A. Sacher
*Attorney, Agent, or Firm*—Bacon & Thomas

[57] ABSTRACT

A four component six lens element Gauss type objective having an aperture ratio of at least 1:2.4 and a field angle of greater than 40°, comprising in the direction of light travel: a first single component positive meniscus concave toward the diaphragm; a second and third cemented doublet meniscus component concave toward the diaphragm, each of the doublet components having planar bond surfaces and a low positive or negative power of refraction; a diaphragm located between said second and third component; and a fourth single component having positive power of refraction with the weaker surface facing the diaphragm; wherein at least two pairs of spherical lens surfaces which are arranged symmetrically with respect to the diaphragm have identical radii of curvature; wherein the ratio of the dispersion values of the first and sixth lens, of the second and fifth lens, and of the third and fourth lens, respectively, in the direction of light travel, are essentially as follows:

$$0.58 \leq \nu_1 : \nu_6 \leq 1.0$$

$$0.8 \leq \nu_2 : \nu_5 \leq 0.9$$

$$0.74 \leq \nu_3 : \nu_4 \leq 0.8$$

wherein the refractive indices of the third and second lenses, and of the fourth and fifth lenses, respectively, in the direction of light travel, differ essentially as follows:

$$0.5 \leq n_3 - n_2 \leq 0.20$$

$$0.05 \leq n_5 - n_4 \leq 0.15;\text{ and}$$

wherein the radius of curvature of the sixth lens in the direction of light travel, on the surface facing toward a viewed object, is greater than six times the focal length of the objective.

9 Claims, 11 Drawing Figures

FOUR-MEMBER GAUSS OBJECTIVE

BACKGROUND OF THE INVENTION

1. Field of the Invention

The present invention relates to optical lens systems, and, more particularly, to a four-member Gauss objective consisting of six lenses and having a bonded member with planar bond surfaces arranged on each side of the diaphragm, the objective having a high aperture ratio of at least 1:2.4 and a field angle which is greater than 40°.

2. Description of the Prior Art

Japanese Published Application Sho 46-10291 discloses an objective of this general construction. It has a relatively high aperture ratio and a large field angle.

From the U.S. Pat. No. 3,489,488 is known a Gauss objective which, in addition to having planar bond surfaces, also has a planar surface on the last lens in the direction of light travel, on the side facing toward the viewed object. However, this objective is limited to an aperture ratio of $f$:4 and a field angle of 30°. Because this prior art objective has been designed with a view toward simplification of its construction and toward the possibility of using glass compositions of relatively low refractivity, lens designers have come to the conclusion that any cost-saving simplification of the above-mentioned basic construction of the Gauss objective could only be obtained in a trade-off in which a sacrifice in the imaging performance was made.

On the other hand, there exists the ever-present desire to maintain a certain performance level, once achieved with this type of Gauss objective, in spite of design changes which are aimed at the reduction of production costs.

The production costs of an objective are essentially determined by three cost components, viz. material costs, fabricating costs, and tooling costs. However, the indicated order of importance of the three major cost components applies only to large production quantities. Where quantities are smaller, the materials costs are least in importance, so that the design of these objectives must give first consideration to the fabricating time and to the tooling required, as well as to the mounting arrangement chosen.

A particularly economical mounting arrangement is disclosed in the German Offenlegungsschrift No. 2,364,621, the advantages of which are particularly significant in connection with the use of planar lens surfaces. Accordingly, the Gauss objective should have as many planar surfaces as possible, in order to maximize cost savings.

Using modern fabrication processes, the fabrication time can be reduced most effectively through the use of diamond tools. Tools of this type are very costly, however, and their use is economically justified only in connection with large production quantities. It follows that the aforementioned aim of providing as many planar surfaces as possible correspondingly increases the usefulness of these expensive tools, as fewer of them are required. By the same token, it is desirable that as many lens surfaces as possible have the same radius of curvature, so that fewer special tools are required and those that are required can be put to more efficient usage, thereby reducing fabrication costs accordingly.

These purely production-oriented considerations lead to a Gauss objective with lenses which have only planar-convex or planar-concave surfaces and which are arranged symmetrically in relation to the diaphragm. These requirements, however, signify that, from the very beginning, the degrees of freedom in terms of optical design parameters for correction calculations are considerably reduced. Adding to these constraints is the known characteristic of the above-mentioned Gauss objectives that the majority of lens distances and lens thicknesses can only be varied within a very small range. The only important correction approach remaining under these circumstances is the approach which involves the selection of the lens material for its optical characteristics.

SUMMARY OF THE INVENTION

Underlying the present invention is therefore the object of providing an improved Guass objective.

A further object of the invention resides in providing novel combinations of parameters for a Gauss objective which can be produced with a minimal number of fabricating tools and in the shortest time possible.

It is also an object of the invention to provide such an improved Gauss objective which can be used in combination with a simple, inexpensive mounting arrangement, while exhibiting excellent optical correction features in conjunction with a large aperture and a comparatively large field angle.

In accomplishing the foregoing objects, there has been provided in accordance with the present invention a four component, six lens element Gauss objective of the type mentioned which, in addition to the remaining spherical lens surfaces, has identical radii of curvature on at least two pairs of spherical lens surfaces which are arranged symmetrically with respect to the diaphragm, and that the ratio of the dispersion values of the first and sixth lens, of the second and fifth lens, and of the third and fourth lens, respectively, in the direction of light travel, is in each case as follows:

$$0.58 \leq \nu_1 : \nu_6 \leq 1.0$$

$$0.8 \leq \nu_2 : \nu_5 \leq 0.9$$

$$0.74 \leq \nu_3 : \nu_4 \leq 0.8$$

and further, that the refractive indices of the third and second lenses, and of the fourth and fifth lenses, respectively, in the direction of light travel, differ as follows:

$$0.05 \leq n_3 - n_2 \leq 0.20$$

$$0.05 \leq n_5 - n_4 \leq 0.15,$$

and further, that the radius of curvature of the sixth lens in the direction of light travel, on the surface facing toward the object, is greater than six times the focal length.

A preferred embodiment of the invention provides for the sixth lens in the direction of light travel to have a planar surface facing toward the viewed object, thereby providing a particularly advantageous design.

The specific design parameters of nine different embodiments of Gauss objectives embodying the present invention are listed in the application. It should be understood that deviations from these specific design data, to the extent that they do not significantly change the correction status of the objectives, are to be considered as being covered by the claims. An insignificant change, in the meaning intended here, is a change of the parameters reflecting itself in diameter change of the aberrated point image of ±20 percent.

Further special objects, features and advantages of the invention will become apparent from the following description, when taken together with the accompanying drawings which illustrate, by way of example, several embodiments of the invention.

DESCRIPTION OF PREFERRED EMBODIMENTS

Figure 1:
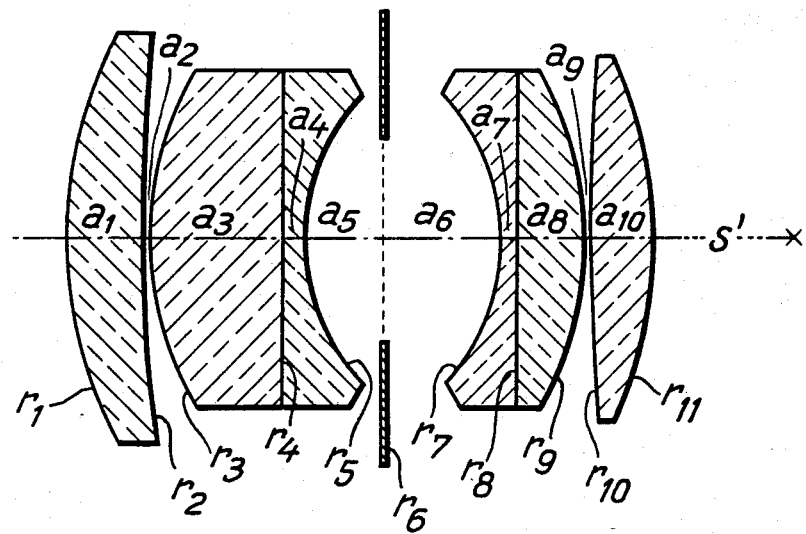
FIG. 1 shows a schematic lens cross-section through an objective embodying the invention, with two pairs of spherical surfaces arranged symmetrically with respect to the diaphragm.
Figure 2:
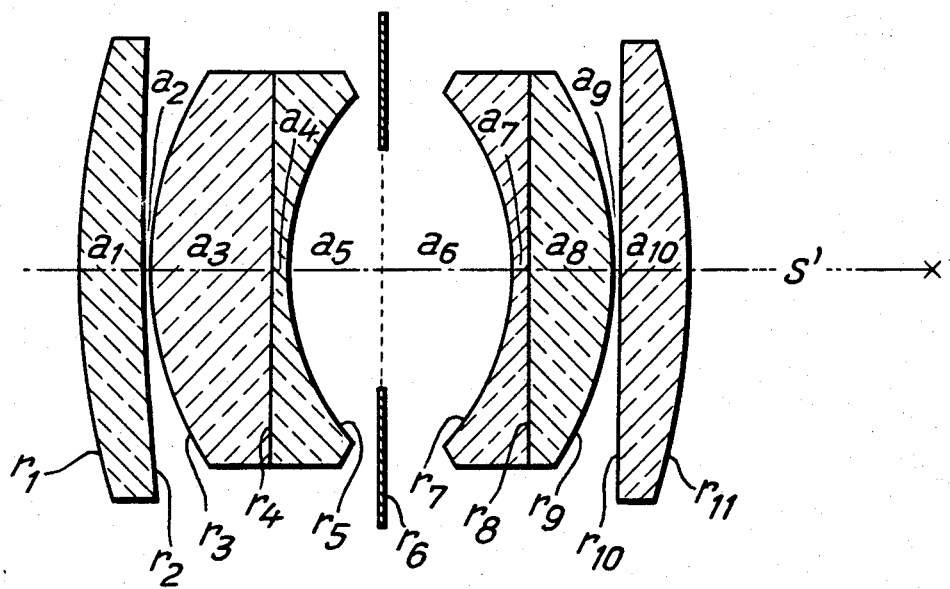
FIG. 2 shows a similar schematic lens cross section through an objective embodying the invention, with an additional planar lens surface and three pairs of spherical lens surfaces arranged symmetrically with respect to the diaphragm.
Figure 3:
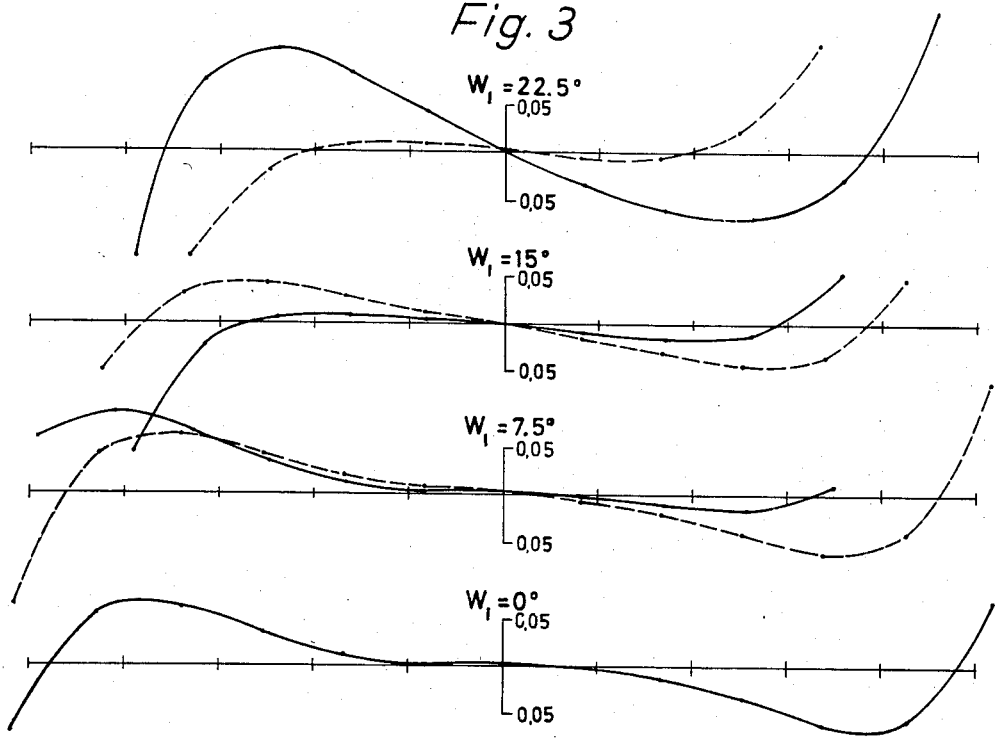
FIGS. 3 through 11 are diagrams of correction curves representing the transverse abberations for the lens parameters of specific embodiments according to the invention.
Figure 4:
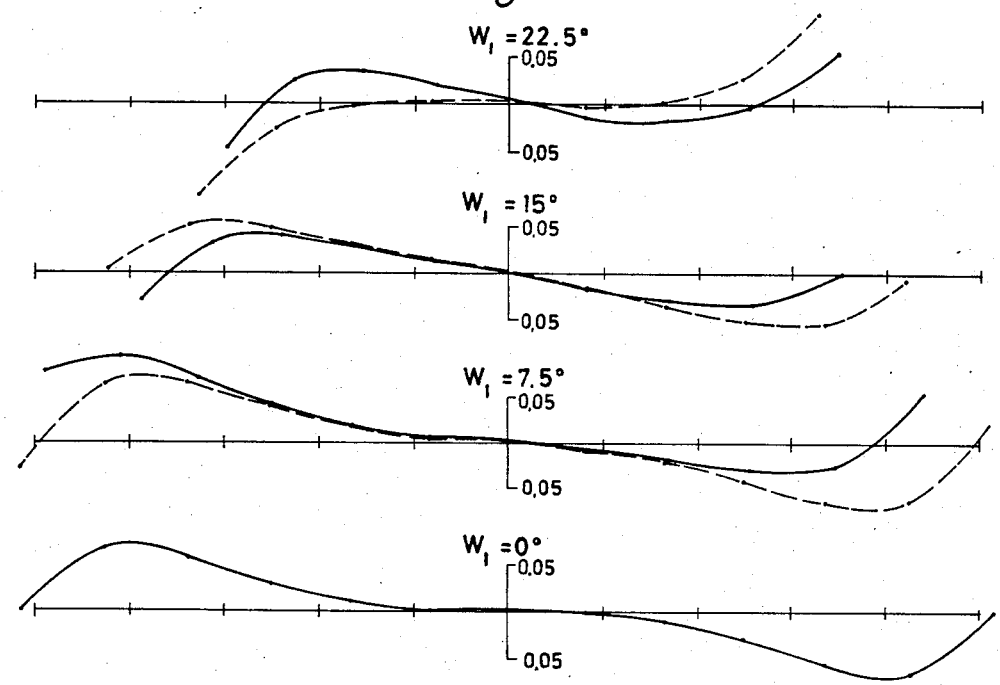
Figure 5:
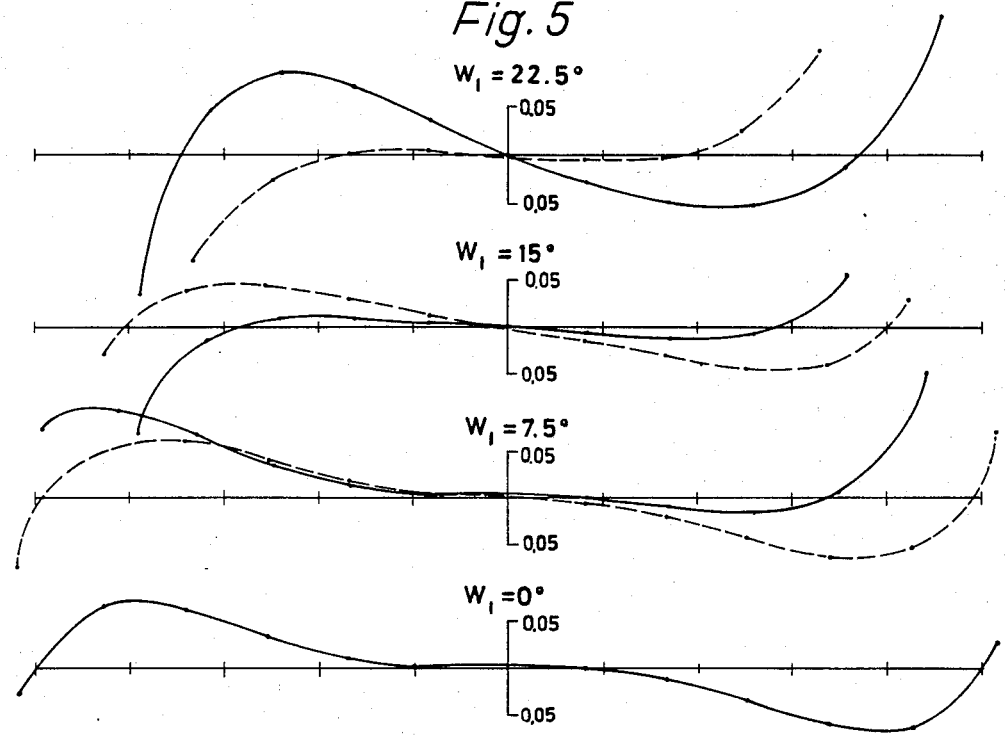
Figure 6:
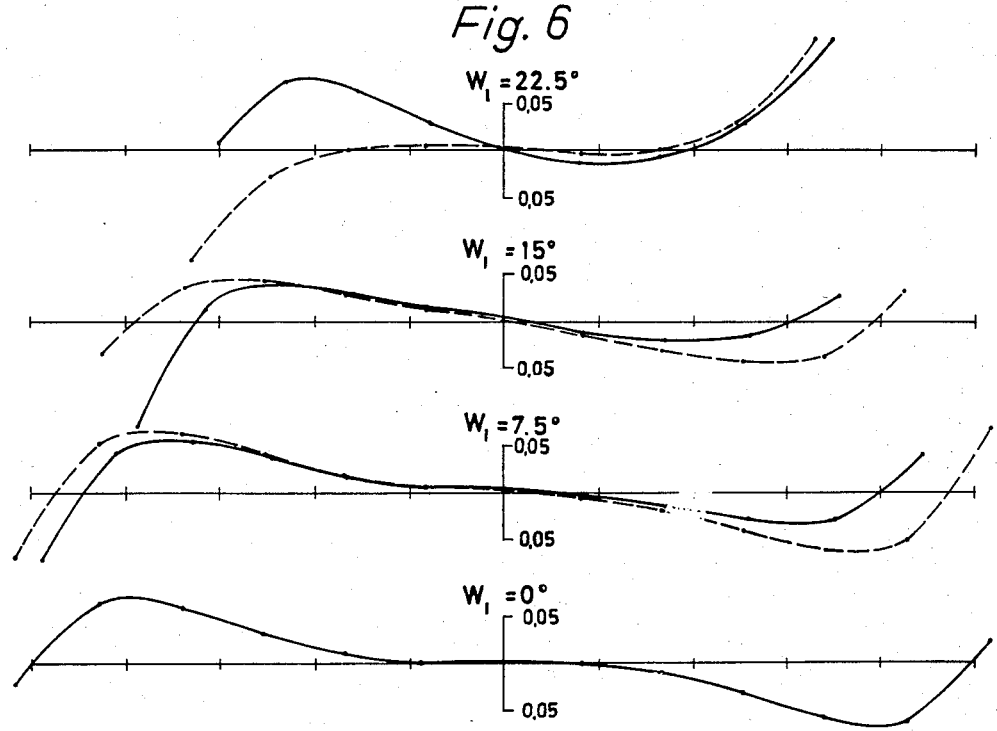
Figure 7:
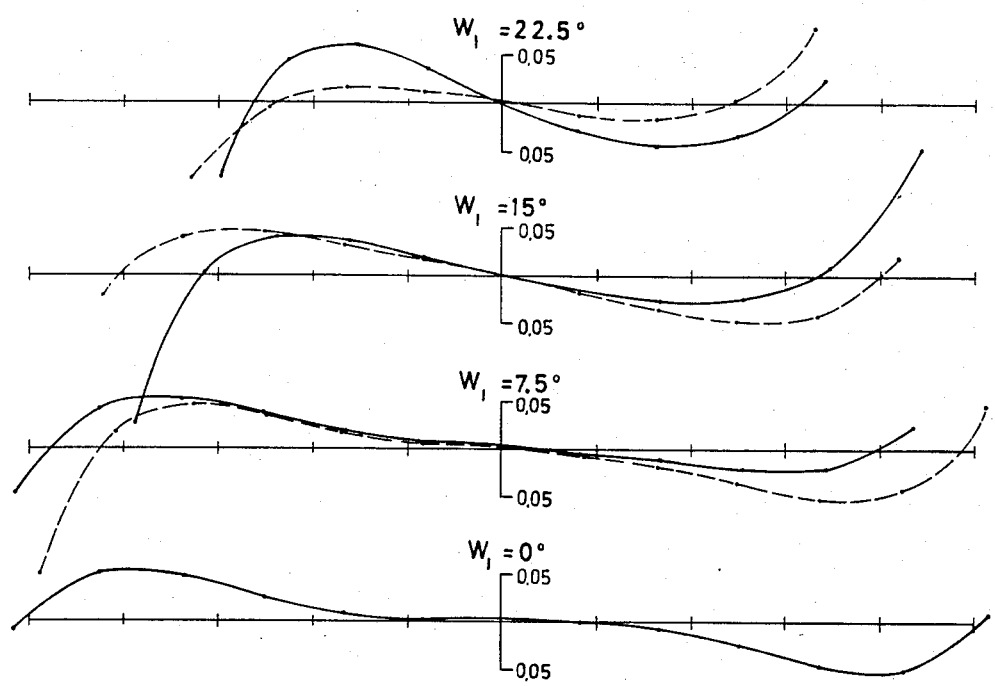
Figure 8:
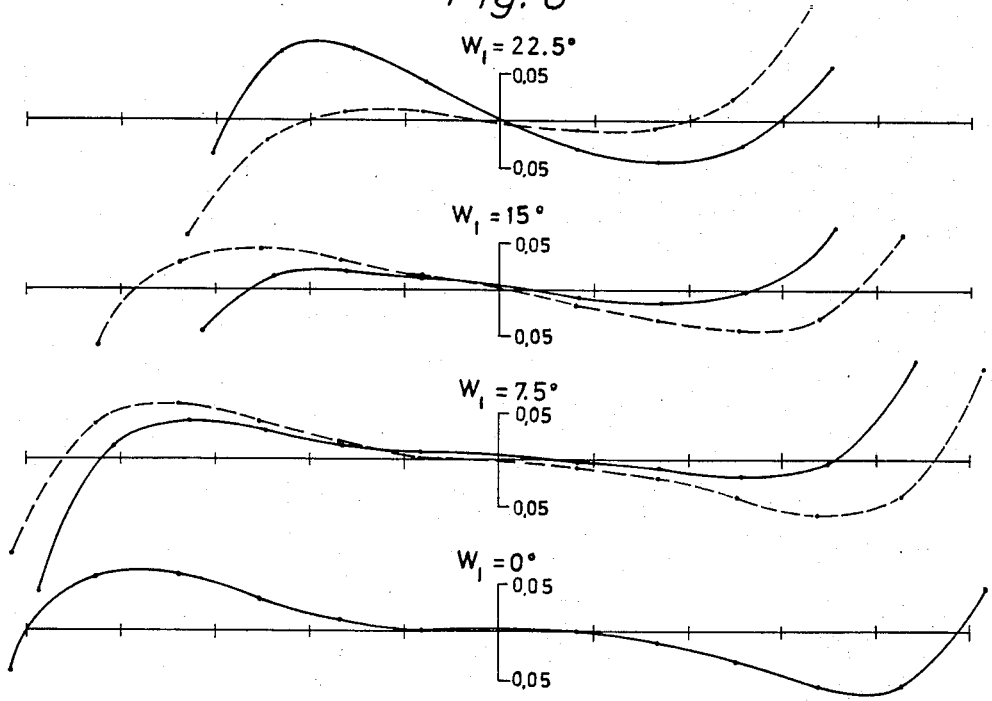
Figure 9:
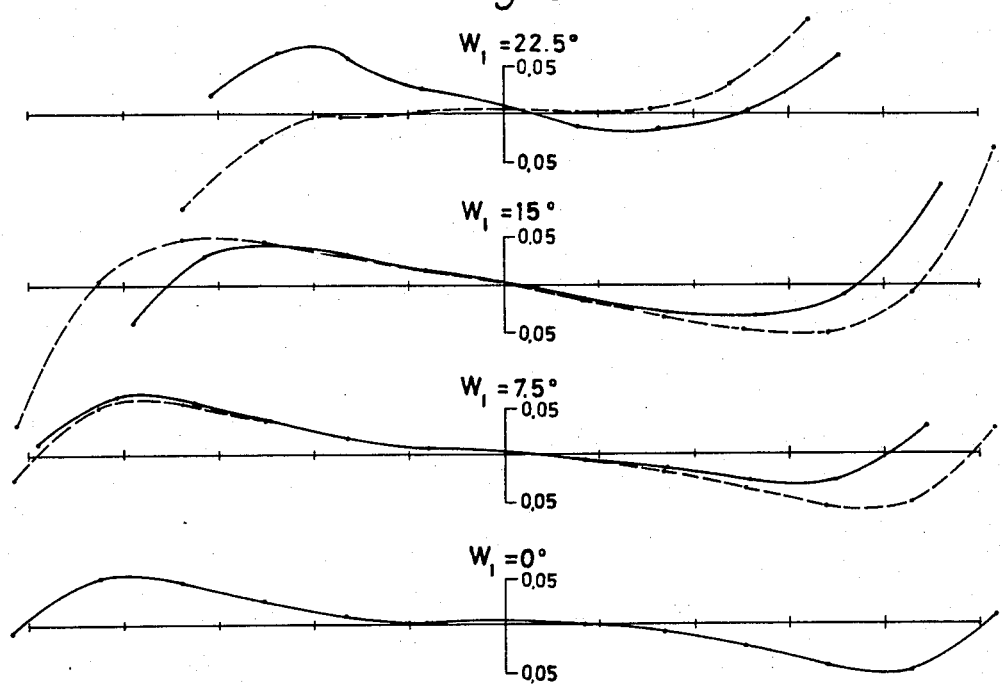
Figure 10:
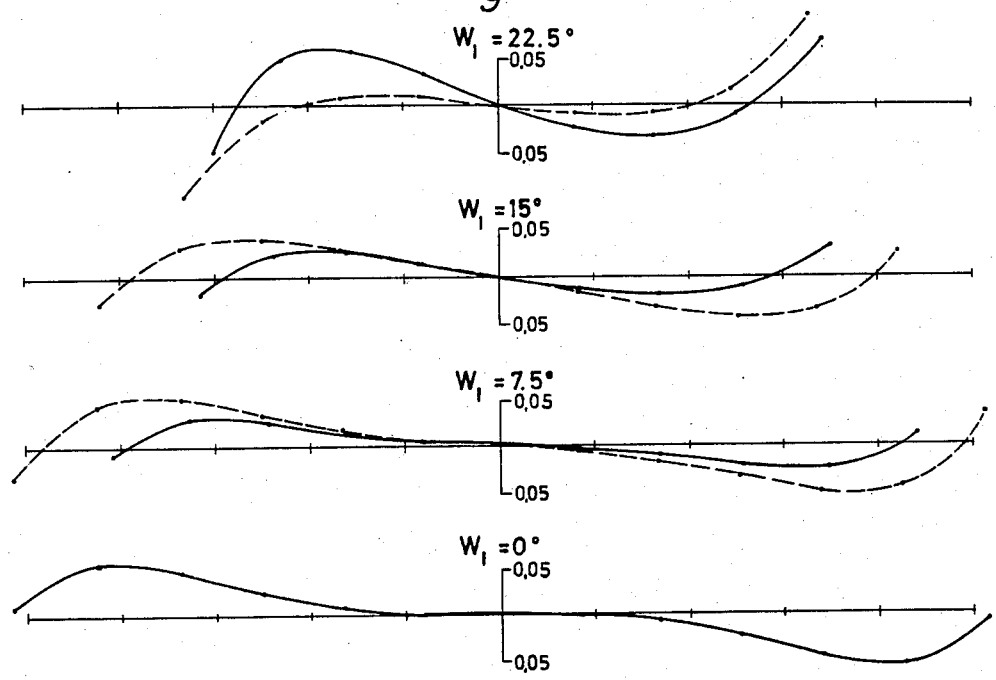
Figure 11:
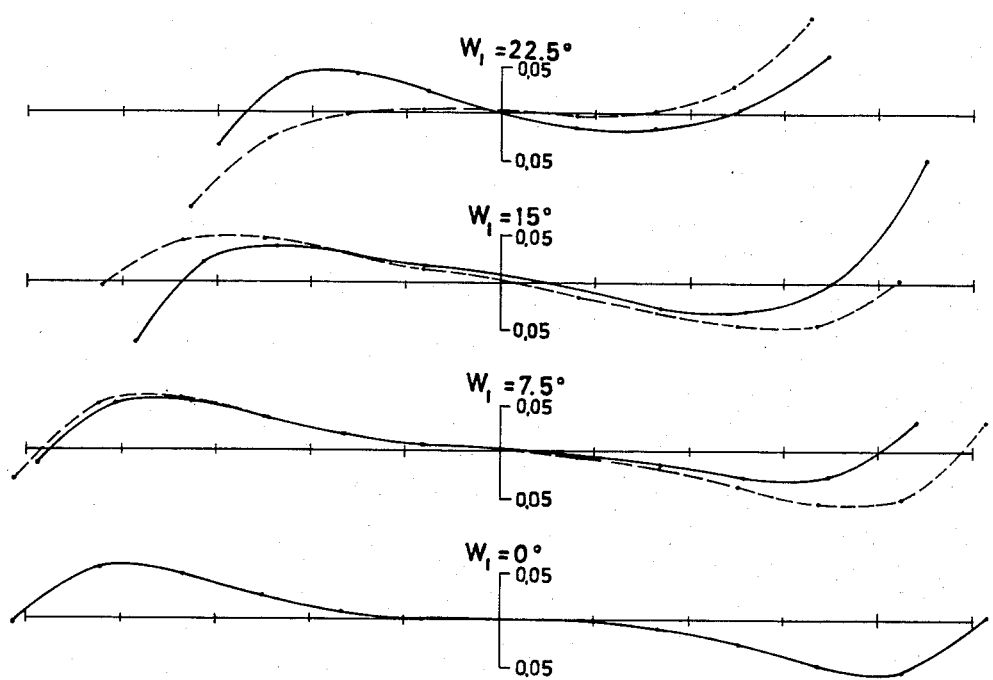

Two different Gauss objectives embodying the present invention are shown in FIG. 1 and FIG. 2, respectively. In each case, the lens surfaces are designated with $r_1$ through $r_{11}$. For the sake of simplicity of the nomenclature, the diaphragm in the midportion of the objective is designated with $r_6$. The distances from lens vertex to lens vertex and to the diaphragm are indicated with $a_1$ through $a_{10}$ and the back-focal length is indicated with $s'$.

The embodiment illustrated in FIG. 1 is comprised of (first component) a positive meniscus element in the form of concavo-convex lens with surfaces $r_1$ and $r_2$; (second component) a cemented doublet (object side) comprised of a positive plano-convex lens with surfaces $r_3$ and $r_4$ together with a negative plano-concave lens with surfaces $r_4$ and $r_5$, the concave surface $r_5$ facing toward the diaphragm $r_6$ and the bond surface $r_4$ being planar; (third component) a second cemented doublet (image side) comprised of a negative plano-concave lens having surfaces $r_7$ and $r_8$ with the concave surface $r_7$ facing toward the diaphragm $r_6$, together with a positive plano-convex lens having surfaces $r_8$ and $r_9$, again with the bond surface $r_8$ being planar; and (fourth component) another positive element in the form of a lens having non-planar surfaces $r_{10}$ and $r_{11}$.

Each of the doublet components has either a low positive power of refraction or a negative power of refraction.

In the alternative embodiment illustrated in FIG. 2, the first three components are of the same general configuration as the embodiment of FIG. 1. However, the fourth component is comprised of the positive element in the form of a plano-convex lens having planar surface $r_{10}$ and convex surface $r_{11}$.

The correction curves which are given in FIGS. 3 through 11 represent the transverse abberations obtained at various image angles. They demonstrate the excellent correction status of all embodiments of the invention. In accordance with common practice, the curves which are indicated by continuous lines represent the transverse abberations for the sagittal image rays, while the curves which are indicated by dotted lines represent the meridional image rays.

The suggested novel objectives are well suited for use as standard objectives for miniature cameras, and, because of the possibility of a considerable back focal length, they can also be used in connection with miniature cameras of the single lens reflex type.

In order to more fully describe the present invention, the following non-limiting examples of specific representative examples are given.

EXAMPLE 1

Focal length: $f = 100$
Aperture ratio: 1:2
Back focal length: $s' = 59.21$
Field angle: ±22.5°

| Surface No. (i) | Radius ($r_i$) | Distance to next surface ($a_i$) | Lens No. | Refractive Index ($n_{e_i}$) | Abbe- Number ($v_{e_i}$) |
|---|---|---|---|---|---|
| 1 | 48.88 | 8.89 | 1 | 1.62286 | 60.08 |
| 2 | 182.96 | 0.38 |  | 1.0 | — |
| 3 | 36.92 | 15.11 | 2 | 1.58565 | 46.17 |
| 4 | ∞ | 2.31 | 3 | 1.67764 | 31.97 |
| 5 | 23.06 | 9.14 |  | 1.0 | — |
| 6 | (diaphragm) | 13.36 |  | 1.0 | — |
| 7 | −23.91 | 1.92 | 4 | 1.57046 | 42.56 |
| 8 | ∞ | 7.77 | 5 | 1.64128 | 55.15 |
| 9 | −36.92 | 0.38 |  | 1.0 | — |
| 10 | 1063.24 | 6.73 | 6 | 1.62286 | 60.08 |
| 11 | −48.88 | — |  | 1.0 | — |

EXAMPLE 2

Focal length: $f = 100$
Aperture ratio: 1:2
Back focal length: $s' = 59.71$
Field angle: ±22.5°

| Surface No. (i) | Radius ($r_i$) | Distance to next surface ($a_i$) | Lens No. | Refractive Index ($n_{e_i}$) | Abbe- Number ($v_{e_i}$) |
|---|---|---|---|---|---|
| 1 | 59.32 | 18.56 | 1 | 1.79227 | 47.15 |
| 2 | 147.94 | 0.38 |  | 1.0 | — |
| 3 | 38.70 | 11.27 | 2 | 1.67133 | 41.64 |
| 4 | ∞ | 2.30 | 3 | 1.73430 | 28.19 |
| 5 | 26.03 | 10.07 |  | 1.0 | — |
| 6 | (diaphragm) | 13.12 |  | 1.0 | — |
| 7 | −26.03 | 1.91 | 4 | 1.62408 | 36.11 |
| 8 | ∞ | 8.46 | 5 | 1.72055 | 47.69 |
| 9 | −38.70 | 0.38 |  | 1.0 | — |
| 10 | −9525.05 | 6.38 | 6 | 1.72055 | 47.69 |
| 11 | −59.32 | — |  | 1.0 | — |

EXAMPLE 3

Focal length: $f = 100$
Aperture ratio: 1:2
Back focal length: $s' = 59.04$
Field angle: ±22.5°

| Surface No. (i) | Radius ($r_i$) | Distance to next surface ($a_i$) | Lens No. | Refractive Index ($n_{e_i}$) | Abbe- Number ($v_{e_i}$) |
|---|---|---|---|---|---|
| 1 | 51.05 | 9.06 | 1 | 1.64128 | 55.15 |
| 2 | 190.84 | 0.38 |  | 1.0 | — |
| 3 | 37.54 | 15.36 | 2 | 1.60889 | 43.63 |
| 4 | ∞ | 2.31 | 3 | 1.70444 | 29.84 |
| 5 | 23.67 | 9.16 |  | 1.0 | — |
| 6 | (diaphragm) | 13.35 |  | 1.0 | — |
| 7 | −24.78 | 1.92 | 4 | 1.59911 | 38.91 |
| 8 | ∞ | 7.74 | 5 | 1.66152 | 50.59 |
| 9 | −37.54 | 0.38 |  | 1.0 | — |

-continued

| Surface No. (i) | Radius ($r_i$) | Distance to next surface ($a_i$) | Lens No. | Refractive Index ($n_{e,i}$) | Abbe-Number ($v_{e,i}$) |
|---|---|---|---|---|---|
| 10 | 767.77 | 6.73 | 6 | 1.64128 | 55.15 |
| 11 | −51.05 | — | | 1.0 | — |

EXAMPLE 4

Focal length: $f = 100$
Aperture ratio: 1:2
Back focal length: $s' = 60.03$
Field angle: ±22.5°

| Surface No. (i) | Radius ($r_i$) | Distance to next surface ($a_i$) | Lens No. | Refractive Index ($n_{e,i}$) | Abbe-Number ($v_{e,i}$) |
|---|---|---|---|---|---|
| 1 | 54.30 | 11.38 | 1 | 1.74795 | 44.49 |
| 2 | 149.79 | 0.39 | | 1.0 | — |
| 3 | 37.69 | 12.59 | 2 | 1.67133 | 41.64 |
| 4 | ∞ | 2.31 | 3 | 1.73430 | 28.19 |
| 5 | 24.56 | 10.91 | | 1.0 | — |
| 6 | (diaphragm) | 13.78 | | 1.0 | — |
| 7 | −25.95 | 1.93 | 4 | 1.63003 | 35.45 |
| 8 | ∞ | 6.97 | 5 | 1.72055 | 47.69 |
| 9 | −37.69 | 0.39 | | 1.0 | — |
| 10 | −636.72 | 8.66 | 6 | 1.72055 | 47.69 |
| 11 | −54.30 | — | | 1.0 | — |

EXAMPLE 5

Focal length: $f = 100$
Aperture ratio: 1:2
Back focal length: $s' = 71.20$
Field angle: ±22.5°

| Surface No. (i) | Radius ($r_i$) | Distance to next surface ($a_i$) | Lens No. | Refractive Index ($n_{e,i}$) | Abbe-Number ($v_{e,i}$) |
|---|---|---|---|---|---|
| 1 | 84.34 | 7.76 | 1 | 1.76166 | 27.37 |
| 2 | 298.43 | 0.38 | | 1.0 | — |
| 3 | 38.93 | 13.61 | 2 | 1.70587 | 40.75 |
| 4 | ∞ | 1.94 | 3 | 1.79190 | 25.55 |
| 5 | 28.59 | 10.54 | | 1.0 | — |
| 6 | (diaphragm) | 15.07 | | 1.0 | — |
| 7 | −28.59 | 1.91 | 4 | 1.65284 | 33.59 |
| 8 | ∞ | 9.48 | 5 | 1.79227 | 47.15 |
| 9 | −38.93 | 0.38 | | 1.0 | — |
| 10 | ∞ | 7.40 | 6 | 1.79227 | 47.15 |
| 11 | −84.34 | — | | 1.0 | — |

EXAMPLE 6

Focal length: $f = 100$
Aperture ratio: 1:2
Back focal length: $s' = 61.84$
Field angle: ±22.5°

| Surface No. (i) | Radius ($r_i$) | Distance to next surface ($a_i$) | Lens No. | Refractive Index ($n_{e,i}$) | Abbe-Number ($v_{e,i}$) |
|---|---|---|---|---|---|
| 1 | 50.16 | 7.35 | 1 | 1.66152 | 50.59 |
| 2 | 186.96 | 0.38 | | 1.0 | — |
| 3 | 37.35 | 14.33 | 2 | 1.60889 | 43.63 |
| 4 | ∞ | 2.31 | 3 | 1.70444 | 29.84 |
| 5 | 23.33 | 9.90 | | 1.0 | — |
| 6 | (diaphragm) | 13.12 | | 1.0 | — |
| 7 | −25.18 | 1.92 | 4 | 1.59911 | 38.91 |
| 8 | ∞ | 8.00 | 5 | 1.66152 | 50.59 |
| 9 | −37.35 | 0.38 | | 1.0 | — |
| 10 | ∞ | 6.73 | 6 | 1.64128 | 55.15 |
| 11 | −50.16 | — | | 1.0 | — |

EXAMPLE 7

Focal length: $f = 100$
Aperture ratio: 1:2
Back focal length: $s' = 57.59$
Field angle: ±22.5°

| Surface No. (i) | Radius ($r_i$) | Distance to next surface ($a_i$) | Lens No. | Refractive Index ($n_{e,i}$) | Abbe-Number ($v_{e,i}$) |
|---|---|---|---|---|---|
| 1 | 57.94 | 9.42 | 1 | 1.79227 | 47.15 |
| 2 | 190.48 | 0.38 | | 1.0 | — |
| 3 | 40.31 | 14.67 | 2 | 1.62987 | 38.68 |
| 4 | ∞ | 3.38 | 3 | 1.76859 | 26.31 |
| 5 | 25.75 | 10.33 | | 1.0 | — |
| 6 | (diaphragm) | 13.81 | | 1.0 | — |
| 7 | −27.28 | 1.92 | 4 | 1.63003 | 35.45 |
| 8 | ∞ | 6.73 | 5 | 1.74759 | 44.49 |
| 9 | −40.31 | 0.38 | | 1.0 | — |
| 10 | ∞ | 7.94 | 6 | 1.72055 | 47.69 |
| 11 | −57.94 | — | | 1.0 | — |

EXAMPLE 8

Focal length: $f = 100$
Aperture ratio 1:2
Back focal length: $s' = 71.77$
Field angle: ±22.5°

| Surface No. (i) | Radius ($r_i$) | Distance to next surface ($a_i$) | Lens No. | Refractive Index ($n_{e,i}$) | Abbe-Number ($v_{e,i}$) |
|---|---|---|---|---|---|
| 1 | 82.13 | 7.67 | 1 | 1.73430 | 28.19 |
| 2 | 375.73 | 0.38 | | 1.0 | — |
| 3 | 39.43 | 13.80 | 2 | 1.67133 | 41.64 |
| 4 | ∞ | 2.49 | 3 | 1.79190 | 25.55 |
| 5 | 28.74 | 12.08 | | 1.0 | — |
| 6 | (diaphragm) | 12.84 | | 1.0 | — |
| 7 | −28.74 | 1.92 | 4 | 1.65222 | 33.60 |
| 8 | ∞ | 10.03 | 5 | 1.79227 | 47.15 |
| 9 | −39.43 | 0.38 | | 1.0 | — |
| 10 | ∞ | 7.09 | 6 | 1.79227 | 47.15 |
| 11 | −82.13 | — | | 1.0 | — |

EXAMPLE 9

Focal length: $f = 100$
Aperture ratio: 1:2
Back focal length: $s' = 58.88$
Field angle: ±22.5°

| Surface No. (i) | Radius ($r_i$) | Distance to next surface ($a_i$) | Lens No. | Refractive Index ($n_{e,i}$) | Abbe-Number ($v_{e,i}$) |
|---|---|---|---|---|---|
| 1 | 59.94 | 9.57 | 1 | 1.79227 | 47.15 |
| 2 | 167.31 | 0.38 | | 1.0 | — |
| 3 | 40.30 | 14.35 | 2 | 1.67133 | 41.64 |
| 4 | ∞ | 2.87 | 3 | 1.73430 | 28.19 |
| 5 | 25.67 | 10.81 | | 1.0 | — |
| 6 | (diaphragm) | 13.39 | | 1.0 | — |
| 7 | −27.69 | 1.91 | 4 | 1.63003 | 35.45 |
| 8 | ∞ | 7.65 | 5 | 1.72055 | 47.69 |
| 9 | −40.30 | 0.38 | | 1.0 | — |
| 10 | ∞ | 8.61 | 6 | 1.72055 | 47.69 |
| 11 | −59.94 | — | | 1.0 | — |

What is claimed is:

1. A four component six lens element Gauss type objective having an aperture ratio of at least 1:2.4 and a field angle of greater than 40°, comprising:
   a pair of inner, cemented doublet meniscus components concave toward and defining a central diaphragm space, each of said doublet components having planer bond surfaces and said doublet components having at least one spherical surface each, which are of the same radius of curvature and which are arranged symmetrically with respect to the location of the diaphragm; and
   a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and
   wherein said lens consists essentially of the following design parameters:

Focal length: $f = 100$
Aperture ratio: 1:2
Back focal length: $s' = 59.21$
Field angle: $\pm 22.5°$

| Surface No. (i) | Radius ($r_i$) | Distance to next surface ($a_i$) | Lens No. | Refractive Index ($n_{e,i}$) | Abbe-Number ($\nu_{e,i}$) |
|---|---|---|---|---|---|
| 1 | 48.88 | 8.89 | 1 | 1.62286 | 60.08 |
| 2 | 182.96 | 0.38 | | 1.0 | — |
| 3 | 36.92 | 15.11 | 2 | 1.58565 | 46.17 |
| 4 | ∞ | 2.31 | 3 | 1.67764 | 31.97 |
| 5 | 23.06 | 9.14 | | 1.0 | — |
| 6 | (diaphragm) | 13.36 | | 1.0 | — |
| 7 | −23.91 | 1.92 | 4 | 1.57046 | 42.56 |
| 8 | ∞ | 7.77 | 5 | 1.64128 | 55.15 |
| 9 | −36.92 | 0.38 | | 1.0 | — |
| 10 | 1063.24 | 6.73 | 6 | 1.62286 | 60.08 |
| 11 | −48.88 | — | | 1.0 | — |

2. A four component six lens element Gauss type objective having an aperture ratio of at least 1:2.4 and a field angle of greater than 40°, comprising:
   a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and
   a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and
   wherein said lens consists essentially of the following design parameters:

Focal length: $f = 100$
Aperture ratio: 1:2
Back focal length: $s' = 59.71$
Field angle: $\pm 22.5°$

| Surface No. (i) | Radius ($r_i$) | Distance to next surface ($a_i$) | Lens No. | Refractive Index ($n_{e,i}$) | Abbe-Number ($\nu_{e,i}$) |
|---|---|---|---|---|---|
| 1 | 59.32 | 18.56 | 1 | 1.79227 | 47.15 |
| 2 | 147.94 | 0.38 | | 1.0 | — |
| 3 | 38.70 | 11.27 | 2 | 1.67133 | 41.64 |
| 4 | ∞ | 2.30 | 3 | 1.73430 | 28.19 |
| 5 | 26.03 | 10.07 | | 1.0 | — |
| 6 | (diaphragm) | 13.12 | | 1.0 | — |
| 7 | −26.03 | 1.91 | 4 | 1.62408 | 36.11 |
| 8 | ∞ | 8.46 | 5 | 1.72055 | 47.69 |
| 9 | −38.70 | 0.38 | | 1.0 | — |
| 10 | −9525.05 | 6.38 | 6 | 1.72055 | 47.69 |
| 11 | −59.32 | — | | 1.0 | — |

3. A four component six lens element Gauss type objective having an aperture ratio of at least 1:2.4 and a field angle of greater than 40°, comprising:
   a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and
   a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and
   wherein said lens consists essentially of the following design parameters:

Focal length: $f = 100$
Aperture ratio: 1:2
Back focal length: $s' = 59.04$
Field angle: $\pm 22.5°$

| Surface No. (i) | Radius ($r_i$) | Distance to next surface ($a_i$) | Lens No. | Refractive Index ($n_{e,i}$) | Abbe-Number ($\nu_{e,i}$) |
|---|---|---|---|---|---|
| 1 | 51.05 | 9.06 | 1 | 1.64128 | 55.15 |
| 2 | 190.84 | 0.38 | | 1.0 | — |
| 3 | 37.54 | 15.36 | 2 | 1.60889 | 43.63 |
| 4 | ∞ | 2.31 | 3 | 1.70444 | 29.84 |
| 5 | 23.67 | 9.16 | | 1.0 | — |
| 6 | (diaphragm) | 13.35 | | 1.0 | — |
| 7 | −24.78 | 1.92 | 4 | 1.59911 | 38.91 |
| 8 | ∞ | 7.74 | 5 | 1.66152 | 50.59 |
| 9 | −37.54 | 0.38 | | 1.0 | — |
| 10 | 767.77 | 6.73 | 6 | 1.64128 | 55.15 |
| 11 | −51.05 | — | | 1.0 | — |

4. A four component six lens element Gauss type objective having an aperture ratio of at least 1:2.4 and a field angle of greater than 40°, comprising:
   a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and
   a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and wherein said lens consists essentially of the following design parameters:

Focal length: $f = 100$
Aperture ratio: 1:2
Back focal length: $s' = 60.03$
Field angle: $\pm 22.5°$

| Surface No. (i) | Radius ($r_i$) | Distance to next surface ($a_i$) | Lens No. | Refractive Index ($n_{e_i}$) | Abbe-Number ($\nu_{e_i}$) |
|---|---|---|---|---|---|
| 1 | 54.30 | 11.38 | 1 | 1.74795 | 44.49 |
| 2 | 149.79 | 0.39 | | 1.0 | — |
| 3 | 37.69 | 12.59 | 2 | 1.67133 | 41.64 |
| 4 | ∞ | 2.31 | 3 | 1.73430 | 28.19 |
| 5 | 24.56 | 10.91 | | 1.0 | — |
| 6 | (diaphragm) | 13.78 | | 1.0 | — |
| 7 | −25.95 | 1.93 | 4 | 1.63003 | 35.45 |
| 8 | ∞ | 6.97 | 5 | 1.72055 | 47.69 |
| 9 | −37.69 | 0.39 | | 1.0 | — |
| 10 | −636.72 | 8.66 | 6 | 1.72055 | 47.69 |
| 11 | −54.30 | — | | 1.0 | — |

5. A four component six lens element Gauss type objective having an aperture ratio of at least 1:2.4 and a field angle of greater than 40°, comprising:

a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and wherein said lens consists essentially of the following design parameters:

Focal length: $f = 100$
Aperture ratio: 1:2
Back focal length: $s' = 71.20$
Field angle: $\pm 22.5°$

| Surface No. (i) | Radius ($r_i$) | Distance to next surface ($a_i$) | Lens No. | Refractive Index ($n_{e_i}$) | Abbe-Number ($\nu_{e_i}$) |
|---|---|---|---|---|---|
| 1 | 84.34 | 7.76 | 1 | 1.76166 | 27.37 |
| 2 | 298.43 | 0.38 | | 1.0 | — |
| 3 | 38.93 | 13.61 | 2 | 1.70587 | 40.75 |
| 4 | ∞ | 1.94 | 3 | 1.79190 | 25.55 |
| 5 | 28.59 | 10.54 | | 1.0 | — |
| 6 | (diaphragm) | 15.07 | | 1.0 | — |
| 7 | −28.59 | 1.91 | 4 | 1.65284 | 33.59 |
| 8 | ∞ | 9.48 | 5 | 1.79227 | 47.15 |
| 9 | −38.93 | 0.38 | | 1.0 | — |
| 10 | ∞ | 7.40 | 6 | 1.79227 | 47.15 |
| 11 | −84.34 | — | | 1.0 | — |

6. A four component six lens element Gauss type objective having an aperture ratio of at least 1:2.4 and a field angle of greater than 40°, comprising:

a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and wherein said lens consists essentially of the following design parameters:

Focal length: $f = 100$
Aperture ratio: 1:2
Back focal length: $s' = 61.84$
Field angle: $\pm 22.5°$

| Surface No. (i) | Radius ($r_i$) | Distance to next surface ($a_i$) | Lens No. | Refractive Index ($n_{e_i}$) | Abbe-Number ($\nu_{e_i}$) |
|---|---|---|---|---|---|
| 1 | 50.16 | 7.35 | 1 | 1.66152 | 50.59 |
| 2 | 186.96 | 0.38 | | 1.0 | — |
| 3 | 37.35 | 14.33 | 2 | 1.60889 | 43.63 |
| 4 | ∞ | 2.31 | 3 | 1.70444 | 29.84 |
| 5 | 23.33 | 9.90 | | 1.0 | — |
| 6 | (diaphragm) | 13.12 | | 1.0 | — |
| 7 | −25.18 | 1.92 | 4 | 1.59911 | 38.91 |
| 8 | ∞ | 8.00 | 5 | 1.66152 | 50.59 |
| 9 | −37.35 | 0.38 | | 1.0 | — |
| 10 | ∞ | 6.73 | 6 | 1.64128 | 55.15 |
| 11 | −50.16 | — | | 1.0 | — |

7. A four component six lens element Gauss type objective having an aperture ratio of at least 1:2.4 and a field angle of greater than 40°, comprising:

a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and wherein said lens consists essentially of the following design parameters:

Focal length: $f = 100$
Aperture ratio: 1:2
Back focal length: $s' = 57.59$
Field angle: $\pm 22.5°$

| Surface No. (i) | Radius ($r_i$) | Distance to next surface ($a_i$) | Lens No. | Refractive Index ($n_{e,i}$) | Abbe-Number ($\nu_{e,i}$) |
|---|---|---|---|---|---|
| 1 | 57.94 | 9.42 | 1 | 1.79227 | 47.15 |
| 2 | 190.48 | 0.38 | | 1.0 | — |
| 3 | 40.31 | 14.67 | 2 | 1.62987 | 38.68 |
| 4 | ∞ | 3.38 | 3 | 1.76859 | 26.31 |
| 5 | 25.75 | 10.33 | | 1.0 | — |
| 6 | (diaphragm) | 13.81 | | 1.0 | — |
| 7 | −27.28 | 1.92 | 4 | 1.63003 | 35.45 |
| 8 | ∞ | 6.73 | 5 | 1.74759 | 44.49 |
| 9 | −40.31 | 0.38 | | 1.0 | — |
| 10 | ∞ | 7.94 | 6 | 1.72055 | 47.69 |
| 11 | −57.94 | — | | 1.0 | — |

8. A four component six lens element Gauss type objective having an aperture ratio of at least 1:2.4 and a field angle of greater than 40°, comprising:
 a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and
 a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and
 wherein said lens consists essentially of the following design parameters:

Focal length: $f = 100$
Aperture ratio: 1:2
Back focal length: $s' = 71.77$
Field angle: ±22.5°

| Surface No. (i) | Radius ($r_i$) | Distance to next surface ($a_i$) | Lens No. | Refractive Index ($n_{e,i}$) | Abbe-Number ($\nu_{e,i}$) |
|---|---|---|---|---|---|
| 1 | 82.13 | 7.67 | 1 | 1.73430 | 28.19 |
| 2 | 375.73 | 0.38 | | 1.0 | — |
| 3 | 39.43 | 13.80 | 2 | 1.67133 | 41.64 |

-continued

| Surface No. (i) | Radius ($r_i$) | Distance to next surface ($a_i$) | Lens No. | Refractive Index ($n_{e,i}$) | Abbe-Number ($\nu_{e,i}$) |
|---|---|---|---|---|---|
| 4 | ∞ | 2.49 | 3 | 1.79190 | 25.55 |
| 5 | 28.74 | 12.08 | | 1.0 | — |
| 6 | (diaphragm) | 12.84 | | 1.0 | — |
| 7 | −28.74 | 1.92 | 4 | 1.65222 | 33.60 |
| 8 | ∞ | 10.03 | 5 | 1.79227 | 47.15 |
| 9 | −39.43 | 0.38 | | 1.0 | — |
| 10 | ∞ | 7.09 | 6 | 1.79227 | 47.15 |
| 11 | −82.13 | — | | 1.0 | — |

9. A four component six lens element Gauss type objective having an aperture ratio of at least 1:2.4 and a field angle of greater than 40°, comprising:
 a pair of inner, cemented doublet meniscus components concave toward and defining a central diaphragm space, each of said doublet components having planar bond surfaces and said doublet components having at least one spherical surface each, which are of the same radius of curvature and which are arranged symmetrically with respect to the location of the diaphragm; and
 a pair of outer components of positive power of refraction including a first single component positive meniscus concave toward the diaphragm space and being positioned ahead of said doublet components in the direction of light travel, said outer components having one spherical surface each, which are of the same radius of curvature and which are arranged symmetrically with respect to the location of the diaphragm; and
 wherein said lens consists essentially of the following design parameters:

Focal length: $f = 100$
Aperture ratio: 1:2
Back focal length: $s' = 58.88$
Field angle: ±22.5°

| Surface No. (i) | Radius ($r_i$) | Distance to next surface ($a_i$) | Lens No. | Refractive Index ($n_{e,i}$) | Abbe-Number ($\nu_{e,i}$) |
|---|---|---|---|---|---|
| 1 | 59.94 | 9.57 | 1 | 1.79227 | 47.15 |
| 2 | 167.31 | 0.38 | | 1.0 | — |
| 3 | 40.30 | 14.35 | 2 | 1.67133 | 41.64 |
| 4 | ∞ | 2.87 | 3 | 1.73430 | 28.19 |
| 5 | 25.67 | 10.81 | | 1.0 | — |
| 6 | (diaphragm) | 13.39 | | 1.0 | — |
| 7 | −27.69 | 1.91 | 4 | 1.63003 | 35.45 |
| 8 | ∞ | 7.65 | 5 | 1.72055 | 47.69 |
| 9 | −40.30 | 0.38 | | 1.0 | — |
| 10 | ∞ | 8.61 | 6 | 1.72055 | 47.69 |
| 11 | −59.94 | — | | 1.0 | — |

* * * * *